March 23, 1937.　　　F. STONER　　　2,074,946
INDUSTRIAL TRUCK
Filed April 10, 1935　　　2 Sheets-Sheet 1
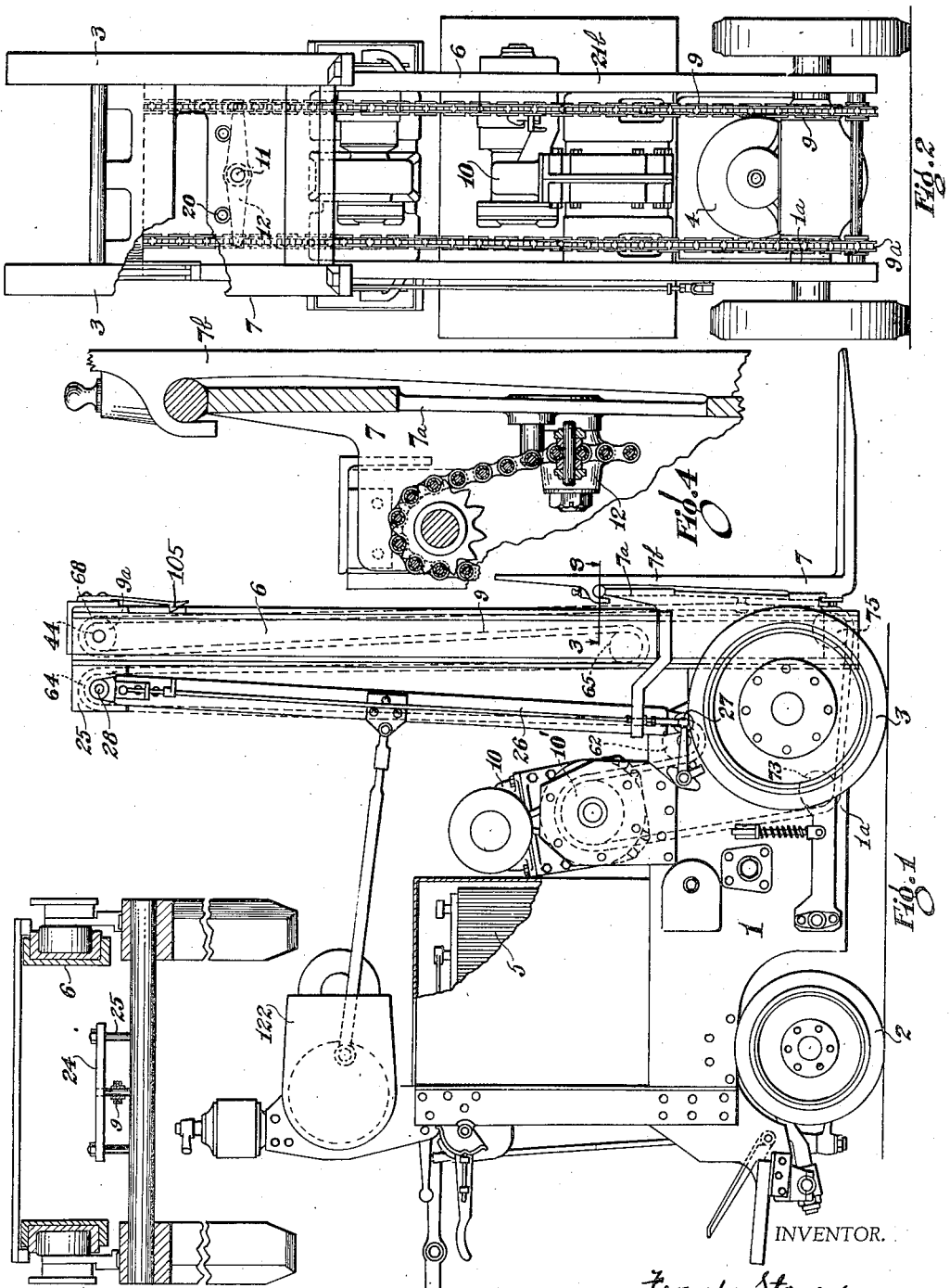
INVENTOR.
BY Frank Stoner
Geo. B. Pitts
ATTORNEY.

March 23, 1937.  F. STONER  2,074,946
INDUSTRIAL TRUCK
Filed April 10, 1935  2 Sheets-Sheet 2
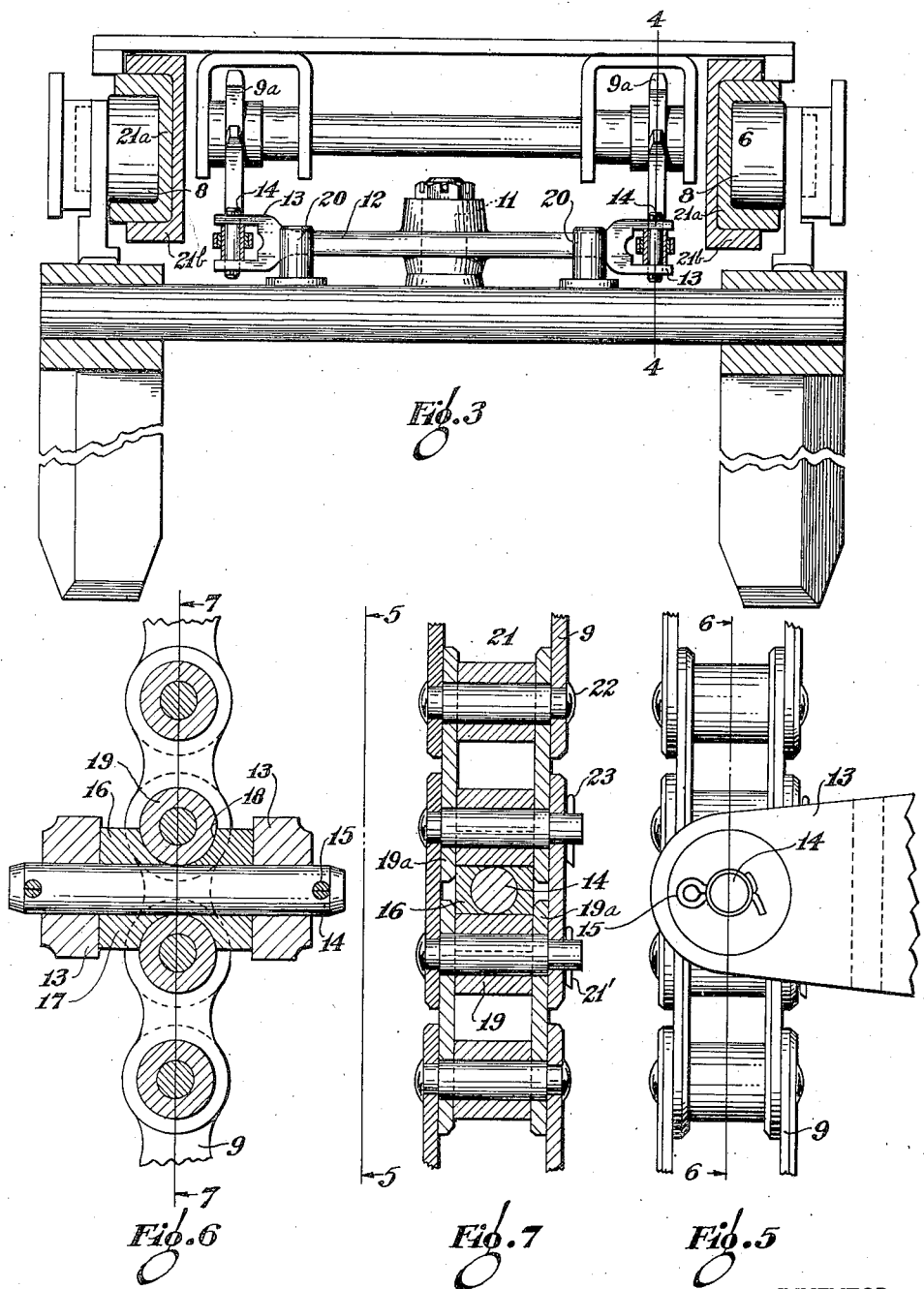
INVENTOR.
Frank Stoner
BY Geo. B. Pitts
ATTORNEY.

Patented Mar. 23, 1937

2,074,946

UNITED STATES PATENT OFFICE 2,074,946

INDUSTRIAL TRUCK

Frank Stoner, Lakewood, Ohio, assignor to The Baker-Raulang Company, Cleveland, Ohio, a corporation of Ohio Application April 10, 1935, Serial No. 15,582

13 Claims. (Cl. 187—9)

This invention relates to an industrial truck having a load lifting or raisable device, the operating means for which include one or more flexible members connected to the raisable device. The type of truck shown for illustrative purposes is disclosed in Letters Patent No. 1,991,576, dated February 19, 1935, granted to Edward H. Remde. The improvement herein disclosed is applicable to the several truck constructions shown in said patent, but to simplify the illustration herein, only one of such constructions is shown.

In trucks of this type, of which I have knowledge, and particularly in those constructions wherein the raisable device was connected to the flexible operating members intermediate their ends, the connecting means between the operating members and the device were so constructed that the latter could not be moved to its extreme upper position as determined by the height of the guides and position of the guide elements for the flexible members; in other words no matter how high the guides extended and at what position the guide elements were mounted, the connecting means for the raisable device imposed limitations on the travel of the raisable device and thus impaired the usefulness of the truck.

One object of my invention is to provide between the raisable device and the operating flexible members therefor, an improved connecting means which overcome the above objection and permit maximum traverse of the raisable device without interference with or engagement of such means with the guide and/or reeving elements for said members.

Another object of the invention is to provide an improved connecting means between the raisable device and the flexible members to compensate for uneven tension in the flexible members and/or relative movement thereof due to stretching or wear.

A further object of the invention is to provide an improved connecting means between a movable member and its operating member that is relatively simple and avoids changing or reconstructing any part of the operating member or substituting for a portion of its length one or more special links.

Other objects of the invention will be apparent to those skilled in the art to which my invention relates from the following description taken in connection with the accompanying drawings, wherein Fig. 1 is a side elevation of a truck embodying my improvement, parts being broken away.

Fig. 2 is a front elevation, with the raisable device in elevated position.

Fig. 3 is a fragmentary section on the line 3—3 of Fig. 2, enlarged.

Fig. 4 is a section on the line 4—4 of Fig. 3, showing the position of the connecting means when the raisable device is in elevated direction.

Fig. 5 is a fragmentary elevation on the line 5—5 of Fig. 6.

Fig. 6 is a section on the line 6—6 of Fig. 5.

Fig. 7 is a section on the line 7—7 of Fig. 6.

Fig. 8 is a view similar to Fig. 3, but showing an arrangement of the connecting means where one flexible member is employed.

In the drawings, 1 indicates the truck frame mounted on steerable wheels 2 and wheels 3, which are preferably driven by an electric motor 4, supplied with current from suitable batteries 5. The frame 1 supports upright guides 6, which may be mounted to tilt inwardly for well known reasons, the latter operation being effected by a mechanism indicated as an entirety at 122. 7 indicates as an entirety a raisable device carrying pairs of rollers 8 (two being shown in Fig. 3), which engage the guides 6 and slidably support the raisable device 7 thereon. The device 7 is raised and lowered by a flexible member 9, preferably two such members as shown in Figs. 1 and 2. The flexible member or members 9 are operated by a power means indicated as an entirety at 10. The herein disclosed guide comprises a plurality of relatively movable sections, preferably two pairs of channel members 21a, 21b, the former one being movable or extensible relative to the section 21b and slidably carrying the load engaging member 7, whereby the latter may be raised to positions above the upper end of the section 21b, the latter section being mounted on the frame 1, preferably in such manner that the guide 6, in any position of the elevating member 7 may be tilted inwardly, as above set forth. In the preferred form of construction, the guide section 21b is supported by and pivotally connected at its upper end to the upper ends of a pair of swingable members 26. The lower ends of the members 26 are provided with knuckles which are pivoted on the frame plates 1a, by stud shafts 27 on the outer sides thereof. The upper ends of the members 26 are provided with knuckles which are pivoted on the ends of a shaft 28 having bearing on and extending through brackets 25. As the guide section 21a is slidably carried by the guide section 21b, swinging movement of the latter will move the other section with it. The shafts 27 are so arranged that the guide 21b may be readily tilted inwardly and outwardly in a ready manner with the expenditure of a relatively small amount of power. The guide 21b at its lower end has sliding and pivotal engagement with the frame 1, as disclosed in the aforesaid patent. The power means may rotate (a) a drum on which one end of each flexible member winds and unwinds or (b) a sprocket 10' around which the member runs. In the former arrangement, the flexible members consist of wire cables. In the latter arrangement each of the flexible members consists of a chain; also, each chain preferably is endless, as shown for illustrative purposes herein, and connected to the device 7 in the manner hereinafter described. The sprocket chains 9 run over and are driven by the sprockets 10' and are connected to the elevating or load carrying member 7 and interconnected to the guide section 21a, whereby these parts are raised and lowered. In my disclosed form of construction those portions of the chains through which the power of the motor is not transmitted, are supported and controlled to permit the free and unobstructed operation of the driven sprockets to transmit pull through, or pay out of, those portions of the chains between the sprockets and the load carrying member 7 in the raising and lowering of the latter. In this form of construction, the chains 9 lead from one side of the sprockets 10' around sprockets 62, then to and around sprockets 64 rotatably mounted on the shaft 28 supported at its opposite ends at the upper ends of the swingable members 26; from the sprockets 64 the chains extend to and around sprockets 65; from the sprockets 65 the chains extend to and around sprockets 68 rotatably mounted on a shaft 44, mounted at the upper end of the guide section 21a. From the sprockets 68, the chains extend downwardly for connection to the opposite ends of an equalizing or evener member 12 trunnioned on the raisable device 7. From the other side of the sprockets 10' the chains extend to and around sprockets 73; from the sprockets 73 the chains 9 extend to and around sprockets 75, and then upwardly as shown. The guide section 21a is locked to the guide section 21b by suitable means, such as a pair of dogs 105 (only one being shown) during vertical travel of the raisable device 7 along the guide section 21a until it approaches the upper end thereof; if thereafter the raising operation is continued, the raisable device will engage the dogs and release the guide section 21a and serve to lift it and the raisable device to the limit of movement of the section 21a along the guide section 21b. The raisable device is shown as consisting of a main section 7a and a load carrying section 7b detachably mounted on the main section 7a.

My improved connecting means may be employed where the device 7 is raised and lowered by a single flexible member 9, as shown in Fig. 8, but it has further advantages where two such members are employed.

The main section 7a is provided with an inwardly projecting stud shaft or pin 11. Where a single flexible member 9 is employed to raise and lower the device 7, the pin 11 forms one of the elements of the connecting means between the device and the member (see Fig. 8), but where two flexible members 9 are used, the evener or equalizing member 12 is interposed between them and the device 7 (see Figs. 1 to 7, inclusive). In this latter form of construction, each end of the member 12 is provided with bifurcations 13, which rotatably support the opposite ends of a shaft 14, the shaft being held against endwise movement by any suitable means, for example, cotter pins 15. As shown, the bifurcations 13 at each end of the member 12 are disposed on opposite sides of the adjacent flexible member and the adjacent pin 14 extends through an opening formed therein, the pin being supported so that its axis intersects the axis of the flexible member. Where each flexible member is provided with a link in its length, the space within the side and end bars of the link form the opening. 16 indicates a connector mounted in the walls of the opening in the flexible member and formed with a through opening 17 through which the pin 14 extends. The connector 16 has a length axially of the opening 17 sufficient to permit it to loosely fit between the adjacent bifurcations 13 and is formed on opposite sides with grooves 18, disposed at right angles to the opening 17 and midway between its ends, to receive the inward or opposed portions of the end bars 19 of the link. The grooves are preferably shaped to fit the walls of the end bars so as to distribute the load through the connector on the pin 14. The end bars of the chains are preferably provided with rollers 19 which fit into the grooves 18. The connector has a width substantially equal to the width of the space between the side bars 19a of the link. As the grooves 18 form seats for the rollers 19 mounted on the end bars of the adjacent links, the chain 9 is maintained midway between the adjacent bifurcations 13 at all times; that is, the chain and connector are interlocked to prevent movement of the chain endwise of the pin 14. As the pin 14 is free to rotate in the bifurcations 13 and also in the connector 16, a pivotal connection is provided between the flexible member and each end of the evener member 12, to permit rocking of the latter in the event of uneven tension on the flexible members or uneven stretching thereof. The main section 7a of the device 7 may be provided with suitable stops 20, to limit the rocking of the member 12 in either direction. It will be noted that the connector 16, longitudinally of the flexible member, is of minimum height, such height being less than the distance between the axes of the end bars for the link in which the connector is mounted. This is an important advantage as it insures free articulation of the two adjacent links about such axes, as illustrated in Fig. 4; accordingly, the raisable device 7 may be operated to its extreme position in either direction.

Where one flexible member 9 is used, as shown in Fig. 8, a connector 16 is mounted in one link of the member, as already described above, and the pin 11 extends through the connector. In this arrangement the pin 11 is made somewhat longer and is preferably supported at its outer end by a cross member 24 rigidly supported on the outer ends of a pair of bolts 25. The cross member 24 is shaped and arranged so as not to limit the movement of the raisable device in either direction.

To those skilled in the art to which my invention relates, many changes in construction and widely differing embodiments and applications of the invention will be apparent without departing from the spirit and scope of the invention. My disclosures and the description herein are purely illustrative and are not intended to be in any sense limiting.

What I claim is:

1. In an industrial truck, the combination of a wheel mounted frame, a device mounted thereon to move vertically, power means for operating said device including an endless flexible member, and a pivotal connection between said device and said member whereby said member raises and lowers said device, said connection consisting of a pair of elements carried by said device and member and disposed at right angles to each other, one of said elements consisting of a bearing and the other element consisting of a pin rotatably fitting into said bearing.

2. In an industrial truck, the combination of a wheel mounted frame, a device mounted thereon to move vertically, power means for operating said device including a flexible member formed with a transverse opening, a pin carried by said device and extending through said opening, and an element engaging the walls of said opening and formed with an opening to receive said pin.

3. In an industrial truck, the combination of a wheel mounted frame, a device mounted thereon to move substantially vertically, power means for operating said device including a flexible member formed with a transverse opening, a pin carried by said device and extending through said opening, and an element engaging the walls of said opening and formed with an opening to receive said pin, said element being interlocked to the walls of said opening to prevent movement of the flexible member endwise of said pin.

4. In an industrial truck, the combination of a wheel mounted frame, a device mounted thereon to move vertically, power means for operating said device including a flexible member formed with a transverse opening and extending along the guide for said device at one side of the path of movement thereof, a bearing element in said opening, a supporting member on said device spaced therefrom and disposed on the remote side of said flexible member from said device, and a pin supported at its opposite ends by said device and said supporting member and extending through said bearing element.

5. In an industrial truck, the combination of a wheel mounted frame, a device mounted thereon to move vertically, power means for operating said device including a pair of flexible members having portions disposed parallel to the path of movement of said device, each member being formed with a transverse opening through it, a bearing element mounted in each said opening, and an equalizing member mounted to rock on said device and provided at its outer ends with shafts mounted in said bearing elements.

6. In an industrial truck, the combination of a wheel mounted frame, a device mounted thereon to move vertically, power means for operating said device including a pair of endless flexible members having portions disposed parallel to the path of movement of said device, each member being provided in its length with a link having side and end bars, a bearing element mounted in the space within the bars of each of said links, and an equalizer mounted to rock on said device and provided at its outer ends with shafts mounted in said bearing elements and serving as the operating connection between said members and said device to raise and lower the latter.

7. In an industrial truck, the combination of a wheel mounted frame, a device mounted thereon to move vertically, power means for operating said device including a pair of flexible members having portions disposed parallel to the path of movement of said device, each member being provided in its length with a link having side and end bars, a bearing element mounted in the space within the bars of each of said links, and an equalizer mounted to rock on said device and provided at its outer ends with shafts mounted in said bearing elements, opposite sides of each said bearing element being formed with transverse grooves to receive the end bars of the adjacent link.

8. In an industrial truck, the combination of a wheel mounted frame, a device mounted thereon to move vertically, power means for operating said device including a pair of flexible members having portions disposed parallel to the path of movement of said device, each member being provided in its length with a link having side and end bars, a bearing element mounted in the space within the bars of each of said links, an equalizer mounted to rock on said device and provided at its outer ends with bifurcations disposed on opposite sides of said links, and shafts supported by said bifurcations and extending through and rotatably supported in said elements.

9. In an industrial truck, the combination of a wheel mounted frame, a device mounted thereon to move vertically, power means for operating said device including a pair of flexible members having portions disposed parallel to the path of movement of said device, each member being provided in its length with a link having side and end bars, a bearing element mounted in the space within the bars of each of said links, an evener bar mounted to rock on said device and provided at its outer ends with bifurcations disposed on opposite sides of said links, and shafts supported by said bifurcations and extending through and rotatably supported in said elements, said elements being disposed in the plane of said links and each of said shafts intersecting the central longitudinal axis of the adjacent link.

10. In an industrial truck, the combination of a wheel mounted frame, a device mounted thereon to move vertically, power means for operating said device including a pair of flexible members having portions disposed parallel to the path of movement of said device, each member being provided in its length with a link having side and end bars, a bearing element mounted in the space within the bars of each of said links, and an evener bar mounted to rock on said device and provided at its outer ends with shafts mounted in said bearing elements, the thickness of each said element longitudinally of the link being less than the distance between the axes of the end bars of the adjacent link.

11. In a truck, the combination of a wheel mounted frame having guides, a raisable device mounted to move along said guides, sprocket chains on said frame and having portions disposed parallel to said guides, means for operating said chains, a bearing element supported within one link of each chain between its side bars and interlocked to the end bars of the adjacent link to prevent transverse movement of said element, an evener bar pivoted between its ends on said device, each end of said bar having bifurcations disposed on opposite sides of the adjacent bearing supporting link, and a shaft rotatably supported by the bifurcations at each end of said bar and extending through the adjacent bearing element.

12. In an industrial truck, the combination of a wheel mounted frame, a device mounted thereon to move vertically, power means for operating said device including an endless flexible member formed with a transverse opening, and a connection between said member and said device for raising and lowering the latter, said connection consisting of a bearing mounted in said opening, and a pin carried by said device and rotatably fitting into said bearing to pivotally connect said device and member together.

13. In an industrial truck, the combination of a wheel mounted frame, a device mounted thereon to move vertically, power means for operating said device including an endless flexible member formed with a transversely extending opening, and a connection between said member and said device for raising and lowering the latter, said connection consisting of a bearing mounted in said opening against transverse and lateral movement, and a pin carried by said device and rotatably fitting into said bearing, whereby said member and device are pivotally connected together.

FRANK STONER.